United States Patent
Donaldson et al.

(10) Patent No.: US 9,389,829 B2
(45) Date of Patent: Jul. 12, 2016

(54) SPATIAL USER INTERFACE FOR AUDIO SYSTEM

(75) Inventors: Thomas A. Donaldson, London (GB); Alexander M. Asseily, London (GB)

(73) Assignee: AliphCom, San Francisco, CA (US)

( * ) Notice: Subject to any disclaimer, the term of this patent is extended or adjusted under 35 U.S.C. 154(b) by 570 days.

(21) Appl. No.: 12/756,051

(22) Filed: Apr. 7, 2010

(65) Prior Publication Data

US 2011/0010627 A1 Jan. 13, 2011

Related U.S. Application Data

(60) Provisional application No. 61/168,165, filed on Apr. 9, 2009.

(51) Int. Cl.
 *G06F 3/048* (2013.01)
 *G06F 3/16* (2006.01)
 *H04M 1/725* (2006.01)
(52) U.S. Cl.
 CPC ........... *G06F 3/167* (2013.01); *H04M 1/72563* (2013.01)

(58) Field of Classification Search
 USPC ......................................................... 715/727
 See application file for complete search history.

(56) References Cited

U.S. PATENT DOCUMENTS

| | | | |
|---|---|---|---|
| 5,854,843 A * | 12/1998 | Jacknin et al. | 381/309 |
| 2002/0013813 A1* | 1/2002 | Matsuoka | 709/204 |
| 2002/0151996 A1* | 10/2002 | Wilcock et al. | 700/94 |
| 2008/0229206 A1* | 9/2008 | Seymour et al. | 715/727 |
| 2009/0013254 A1 | 1/2009 | Walker et al. | |

* cited by examiner

*Primary Examiner* — William Trapanese
(74) *Attorney, Agent, or Firm* — Kokka & Backus, PC

(57) ABSTRACT

A system, apparatus, and method for generating a spatial user interface for an application, system or device. The user interface includes a means of representing user interface functions or commands as audio signals, with the audio signals being perceived by the user in a spatially different location depending on the function or command. A user input device is provided to enable a user to select a function or command, or to navigate through the spatial representations of the audio signals.

16 Claims, 8 Drawing Sheets

SPATIAL USER INTERFACE FOR AUDIO SYSTEM

CROSS-REFERENCE TO RELATED APPLICATION

This application claims priority from and the benefit of provisional application No. 61/168,165, filed on Apr. 9, 2009, the full disclosure of which is incorporated herein by reference for all purposes.

BACKGROUND

The present invention is directed to user interfaces for electronic devices, and more specifically, to an apparatus and method for providing a user interface for an audio system or sub-system that is based on associating a user interface function or command with an audio signal corresponding to that function or command, and that is perceived by a user in a specific spatial location.

User interfaces, sometimes referred to as man-machine interfaces, enable a user to interact with a variety of devices and applications. Such interfaces may be used to convert user inputs into commands or instructions that are executed by an application to generate an interface or display on a device. User interfaces may also be used to convert user inputs into commands or instructions that cause an application to execute a specific task, process, operation or function. User interfaces may take multiple forms having one or more modes of data input, where such data input modes include touch screen, keypad entry, or input of speech (such as a voice command).

Many systems or devices provide mechanisms for a user to understand and control the functions of the system or device. For example, computer systems typically provide a screen, a keyboard and a mouse (or their functional equivalents) to enable the user to provide inputs and receive feedback as part of enabling a user to control the system. However, some systems or devices are limited in their ability to provide the degree of user interface functionality that may be desired by users for typical operation of the system or device. For example, a mobile telephone typically does not have a mouse and many do not have a full keyboard. In the case of a mobile phone, a smaller screen, a numeric keypad and typically a small number of functional buttons are provided. Some systems may be even more limited in their interface functionality, and may not provide a screen or any form of keyboard or keypad for data input. One example of a system having such a relatively limited interface is an audio headset, which is often used as a wireless audio reception and audio input device in conjunction with a mobile telephone. Typically, such headsets do not provide a screen, and provide only two or three buttons (or other data or command input modes) for user inputs. An advantage of these devices is that they can be used without significantly distracting the user from other tasks, such as driving, and can be produced at low cost with longer battery life than similar devices containing more advanced user interface features.

Devices that can be operated effectively without requiring the user to look at them, or to read information presented on a screen, provide an advantage for a user that may be engaged in another activity, or who wishes to be free to direct their vision to another object or event. It is also an advantage if a device has relatively simple input mechanisms that the user can operate without being distracted from other tasks. Such devices are typically safer to operate when driving, quicker to operate when walking down the street, and they are typically cheaper to produce.

However, a drawback of these types of user interface systems is that they can be difficult to operate for users who are not familiar with the device or its functionality. For example, an audio headset typically requires a user manual to describe how to use the device (whereas a device with a screen may be able to present enough information to enable the user to operate the device without such a manual). Some devices use audio prompts to suggest to the user actions they might wish to take or operations that may be performed on a specific input or based on a certain event. In some cases this may improve the usability of the device, but it is effective only when the range of options is reasonably fixed and the options are reasonably simple to understand by the user.

What is desired are an apparatus and method for generating a user interface suitable for use with a system, where the interface is able to provide an audio signal to a user in situations where the system has no, or only a limited, screen display capability, and/or limited data input capability. It is further desired that the user interface be capable of enabling the user to control a relatively complex system without needing substantial training and without being significantly distracted from other tasks that they may be performing concurrently with operating the system. Embodiments of the invention address these problems and other problems individually and collectively.

SUMMARY

Embodiments of the present invention are directed to systems, apparatuses, and methods for providing a user interface for an electronic device or a software application, for example a mobile phone or an audio headset used to interact with a mobile phone or other device. The inventive user interface includes a means of representing user interface (and hence device) functions or commands as audio signals, with the audio signals being perceived by the user at a spatial location relative to the user that may depend on the function or command. In some embodiments, the spatial location of the audio signal or prompt corresponding to a function or command (or the type of audio signal or prompt used) may be determined in accordance with rules, heuristics, or principles that construct the user interface in a way that is designed to be more readily understood and efficiently used by the user. Thus, in some embodiments, either or both of the audio signal or content (e.g., music, voice prompt, playback of other audio) or the perceived location of the audio signal or content may be designed to suggest to the user the operation of that user interface element, the significance of that user interface element, or another aspect of the user interface element or device.

In some embodiments, the inventive interface is generated by associating audio signals or prompts with user interface functions or commands, where those signals or prompts are caused to be perceived in a spatial arrangement by the user. The ability of a user to perceive a sound as originating from a specific location (e.g., back, front, left side, right side, upper quadrant, lower quadrant, etc.) relative to the user is used as one basis for the inventive user interface or control scheme by associating a specific user interface function or command with a sound that is perceived to originate from a certain direction or location. By separating the perceived directions or locations sufficiently and if desired, varying other characteristics of the sounds (such as volume, repetition, change in pitch, etc.), a user may be provided with multiple user interface controls or commands in a manner that does not require a visual display, or which simplifies the visual display requirements. Further, as noted, the type of audio signals or prompts used, the arrangement of those signals or prompts, or both, may be selected so as to provide one or more of ease of use for the user, conform to a user's expectations or behaviors, increase the likelihood of a user recognizing the signal or prompt, increase the likelihood of a user understanding the meaning of the signal or prompt, etc. The inventive user interface may be used alone or in combination with other user interfaces or data input methods to provide the desired functionality for a user.

As will be described, in some embodiments the present invention includes a spatial model of the user interface elements for a system, apparatus, or device, and a method of generating that model. The spatial model may be generated from a set of rules, heuristics, or criteria that map each user interface element (such as an application's functions or commands) to a spatial location. An audio signal is associated with each user interface element, resulting in a specific sound or sequence of sounds being associated with both a user interface element and a spatial location perceived by a user. A control or selection device is provided to enable a user to select or activate the user interface element and thereby to activate the function, command, or operation associated with the element. In some embodiments, the control or selection device may be used to modify the presentation of the elements by altering the perceived location of the audio signal corresponding to an element or elements of the user interface. The user may thus modify the spatial arrangement of the audio signals or prompts to make them correspond to an arrangement that is more desirable for the user (in terms of ease of use, the user's awareness of the location of the sounds, the user's understanding of the function represented by the audio signal or prompt, etc.).

In some embodiments, the present invention may include the following elements, functions, or capabilities:

- An element, function, or capability for creating and maintaining a conceptual spatial model in which one or more user interface elements are associated with one or more spatial locations in the perceived audio space of a user;
- An element, function, or capability for presenting each user interface element as a spatially separated audio signal or signals, thereby enabling a user to associate such signal or signals with the user interface element or with a function of the user interface element; and
- An element, function, or capability for receiving an input signal from the user that selects or otherwise activates a user interface element, or modifies the arrangement of an audio signal or signals represented by the spatial model.

Embodiments of the present invention may be implemented in multiple forms, including as a system, apparatus, user interface, device, or method. The present invention may be implemented as a method executed by programmed computer hardware or logic gates, as a set of executable instructions contained on a computer readable medium, or in the form of analog circuitry, among other suitable forms.

In one embodiment, the invention is directed to a system to generate a user interface, where the system includes a spatial model generator operative to receive input data associated with a user interface element, and to generate output data defining a spatial location at which a user will perceive an audio signal corresponding to the user interface element, a spatial audio effects processor operative to receive as an input an audio input and to generate the audio signal as an output, the audio signal representing the processed audio input as perceived by the user at the spatial location, and a user input device operative to select the audio signal or to alter the spatial arrangement of the audio signal that is perceived by the user.

In another embodiment, the invention is directed to a user interface, where the user interface includes a plurality of audio signals, each signal being perceived by a user at a spatially distinct location, and each signal associated with a function or operation of the system, device, or application, a user input device operative to select one of the plurality of audio signals or to alter the spatial arrangement of the audio signals that is perceived by the user, and a controller operative to receive a signal from the user input device and in response to activate the function or operation of the system, device, or application, or to alter the spatial arrangement of the audio signals that is perceived by the user.

In yet another embodiment, the invention is directed to a method for generating a user interface, where the method includes accessing information regarding a user interface element, generating a spatial model for the user interface element based on the accessed information, the spatial model representing a mapping of the user interface element to a position in a user's perceived audio space, and associating an audio signal with the position in the user's perceived audio space.

Other objects and advantages of the present invention will be apparent to one of ordinary skill in the art upon review of the detailed description of the present invention and the included figures.

DETAILED DESCRIPTION

Embodiments of the present invention are directed to a user interface (UI) for an application, system, apparatus, or device. The UI is presented to a user as a set of audio signals (tones, music clips, voice prompts, sound effects, phone calls, etc.), with each audio signal corresponding to a user selectable function or operation of the application, system, apparatus, or device. The audio signals are perceived by the user in the user's audio space, and are distributed in space relative to the user's head or body (up, down, left, right, front, back, etc.). In some embodiments, different audio properties or effects may be associated with different regions or locations in that space (such as for example, an echo effect for an audio signal or prompt that is perceived in front of a user, an increasing volume effect for an audio signal or prompt that is perceived to the left of a user, etc.). The distribution of audio signals or prompts in space may be achieved through techniques of processing audio signals so that a person's hearing associates the audio with a "location"; that is each audio signal can be processed and presented to the user to make it seem like the sound of that signal is originating from a specific location relative to the person, or from a location having specific properties or effects. The distribution in space is determined by a spatial UI mapping, which in turn may be determined in accordance with rules, heuristics, etc. that seek to maximize the utility of the UI (e.g., to enhance the likelihood of a user discovering or most efficiently using the UI or the functions or operations facilitated by the UI). The spatial UI mapping may be determined by the application, system, apparatus, or device, or by a sub-routine that accesses data regarding the UI elements or features of the application, system, apparatus, or device and then processes that information to create the spatial mapping. In some embodiments, a user may be provided with a data input device that enables them to navigate the elements of the spatial UI and/or select one of the audio signals, thereby activating a function or operation of the application, system, apparatus, or device. In some embodiments, the data input device may have an operational property that a user can intuitively relate to the distribution of audio signals or prompts in the perceived audio space. For example, moving a control left on the input device might allow navigation to the left in the perceived audio space.

Figure 1:
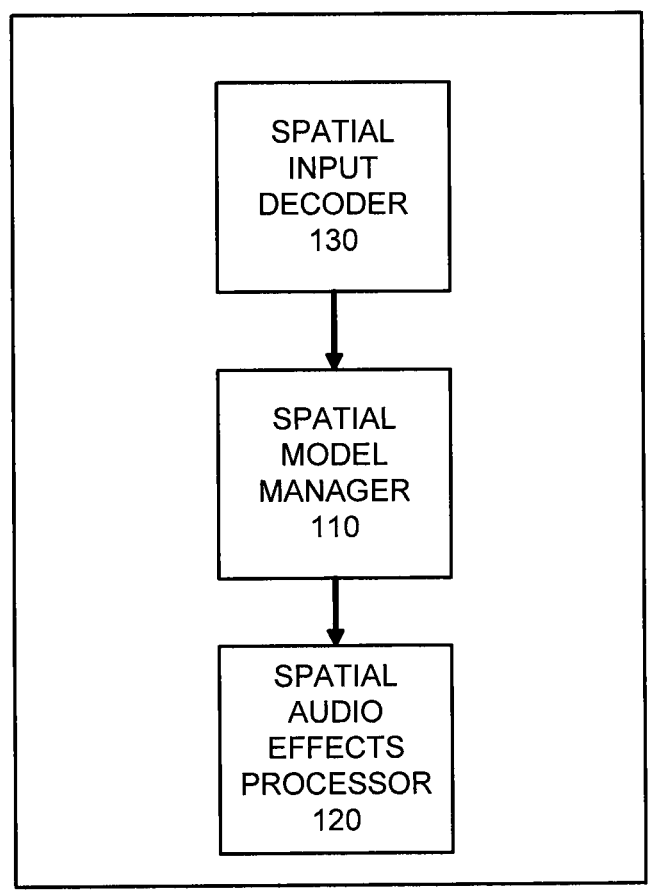
FIG. 1 is a block diagram illustrating the primary functional elements of an example embodiment of the present invention.

FIG. 1 is a block diagram illustrating the primary functional elements of an example embodiment of the present invention. In this example, the invention includes a Spatial Model Manager 110, a Spatial Audio Effects Processor 120, and a Spatial Input Decoder 130. Note that the primary functions of each of the illustrated elements may be implemented in the form of one or more of logic gates, computing hardware, firmware, or as instructions executed by a suitably programmed processor or computing device.

Spatial Model Manager 110 maintains data corresponding to a spatial arrangement or model of a number of user interface elements, and as will be described, updates the spatial arrangement in response to changes in application (or device or system) requirements, or in response to a user input. Spatial Model Manager 110 operates to manage the user perceived position of one or more user interface elements in an abstract space (such as a space into which audio signals may be mapped or presented), and to modify the perceived position of such user interface elements in such a space in response to a user input.

Among others, the functions performed by Spatial Model Manager 110 may include:

Adding a new user interface element to the model (and hence adding a corresponding audio signal to the user's perceived audio space);

Removing a user interface element (and hence the audio signal corresponding to that element) from the user's perceived audio space;

Updating the position of some or all of the user interface elements in the user's perceived audio space (or other abstract space) in response to a user input; or Determining the arrangement of user interface elements in the user's perceived audio space, i.e., the spatial arrangement of audio signals corresponding to the user interface elements that are perceived by a user.

In some embodiments, a device or application may add a user interface element to a spatial model (and thereby to the spatial user interface as a whole) by using a function provided by Spatial Model Manager 110 that allows defining or adding new elements. Similarly, a device or application may modify the function or operation of a user interface element to provide a user with a new or added functionality for that element. For example, a new element "add" function may operate to allow the device or application to provide the element itself (thereby providing a source or sink of audio data, the playback of which would constitute the presentation of the user interface element). The user interface element may be provided with or without data or characteristics that may assist Spatial Model Manager 110 to optimally or most effectively arrange the user interface elements in the user's perceived audio space. For example, a user interface element might be provided with a characteristic indicating that it is a default or most likely choice. In response, Spatial Model Manager 110 may arrange the set of user interface elements such that the default or most likely choice element is typically presented to the user in a similar location or is located in a manner that is predictable to, or expected by the user. As will be discussed, the addition of a user interface element to a spatial model will typically lead to Spatial Model Manager 110 re-evaluating the positions of other of the elements in the model in order to present the whole set of user interface elements to the user in an optimal or desired manner.

Spatial Model Manager 110 may also provide a means to remove an element from the spatial model (and thereby a means to stop the presentation of the user interface element to the user). As with the addition of an element, removing one or more elements may lead to Spatial Model Manager 110 re-evaluating the position of other of the user interface elements in the spatial model.

Spatial Model Manager 110 may provide a mechanism or process for a positional (e.g., translational or rotational) transformation to be applied to some or all of the user interface elements in the spatial model, typically in response to a user input. For example, if a user performed a user interface action that had the effect of "moving the user forward", then Spatial Model Manager 110 may apply a transformation (e.g., a translation), such that user interface elements that are perceived to be "in front of" the user move towards them, while those "behind the user" move away from them.

A function of Spatial Model Manager 110 that is in addition to allowing user interface elements to be added to or removed from the spatial model is to determine the position of the user interface elements in the user's perceived audio space, and to re-calculate such positions when necessary (for example, as a result of user interaction or the device or application making changes to the availability of user interface elements or to their characteristics). In this regard, embodiments or implementations of the invention may use different mechanisms for determining the position of the user interface elements in the user's perceived audio space.

For example, in one implementation, Spatial Model Manager 110 might arrange the user interface elements in a half-circle, with such a half-circle being initially centered on the user and being in front of or alongside the user. In some embodiments, Spatial Model Manager 110 may arrange the elements purely on the basis of the order in which they were added to the user interface. In such an instance, Spatial Model Manager 110 might provide each element with a position given by:

$$P_i = (1 \mid \theta_i) = \left(1 \mid \frac{\pi \cdot i}{N}\right),$$

which results in a distribution such that the elements are uniformly spaced along the unit half-circle, the first one being to the left, the last to the right.

In another example, the elements might be ordered based not on the order in which they were added to the user interface, but instead an order determined by Spatial Model Manager 110 on the basis of the characteristics of the user interface elements. For example, if each element is provided with a priority characteristic or indicator, then Spatial Model Manager 110, might order the elements such that the highest priority element is element 0, the next highest is element 1, etc, and then provide each with a position that is calculated as:

$$P_i = (1 \mid \theta_i) = \left(1 \mid \frac{\pi \cdot p(i)}{N}\right),$$

where p(i) is the priority of the $i^{th}$ element.

In yet another example, more than one characteristic might be provided and/or a multiple-dimensional space might be used. For example, if each element is provided with an urgency characteristic and a priority characteristic, then the position might be determined as $$P_i = (r_i \mid \theta_i) = \left(\frac{1}{U_i} \mid \frac{\pi \cdot p(i)}{N}\right),$$

where the arrangement around the half-circle is determined as above, but the distance from the user (e.g., the radius) is determined such that the less urgent the user interface element, the further it is placed radially from the user.

Note that in some embodiments, Spatial Model Manager 110 may be implemented as appropriate software code running on an appropriate microprocessor, such as an ARM7 microprocessor, for example.

Spatial Audio Effects Processor 120 operates to generate, modify, or otherwise process audio content or data that is associated with each user interface element presented to a user as part of the spatial model. This creates an audio signal or signals that are perceived by a user to be spatially distinct and which are used to convey to a user the spatial arrangement of the user interface elements as they are defined according to Spatial Model Manager 110.

Spatial Audio Effects Processor 120 operates to process the audio stream, signal, or content associated with each user interface element to create the perception to the user of the spatial arrangement of each stream, signal, or content. The position or location of the user interface element corresponding to the stream, signal, or content in the spatial model maintained by Spatial Model Manager 110 is provided as an input for this process or function.

For each stream, signal, or content corresponding to a user interface element, Spatial Audio Effects Processor 120 receives audio data until the audio content for the user interface element is complete. For example, in the case where the user interface element is an audio file (such as a .wav file or a .mp3 file), Spatial Audio Effects Processor 120 receives audio data at a reasonably constant rate (the file encoding sample rate) until the file has been completely played back.

In one embodiment or implementation, Spatial Audio Effects Processor 120 may provide each stream, signal, or content with a position in stereo space. If each input is mon-aural, then Spatial Audio Effects Processor 120 may create two copies of the input (namely a 'Left' and a 'Right' output) and then may alter the 'stereo balance' of the output. In such an operation, the stereo balance may be altered by amplifying one signal and attenuating the other, while keeping the total signal power the same (so that the signal appears to come more from one side of the body than the other). Stereo balance can also be altered by retarding one signal relative to the other by a time difference equivalent to the time difference between receipt of a signal from a point in space on one side of the body compared to the other (where as is known, a signal originating from a point in space that is not equidistant from both ears will take a slightly longer amount of time to reach the ear that is further away).

In some embodiments, a function of Spatial Audio Effects Processor 120 may be to apply some combination of audio effects, including for example amplification, attenuation, retardation, equalization, frequency-dependant amplification or attenuation, the introduction of reverberation, etc. so as to produce an effect perceptually recognized by the user as establishing an apparent position of the audio stream, signal, or content in the perceived space around the user. Spatial Audio Effects Processor 120 may use as its input for this process the desired position for the audio user interface element as received from Spatial Model Manager 110 and may apply a set of filters to place the audio for that user interface element at that apparent position in space so that it is perceived in the desired location by the user.

Note that in some embodiments, Spatial Audio Effects Processor 120 may be implemented as suitable digital signal processing code running on an appropriate digital signal processor or microprocessor, such as the Kalimba digital signal processor or an ARM7 microprocessor for example, or as a set of analog audio signal processing filters connected together. For example, Spatial Audio Effects Processor 120 might be implemented as a programmable amplification element (e.g., an operational amplifier arranged to provide a programmable gain) connected to a programmable delay element (e.g., an operational amplifier arranged to provide a programmable delay), together with a programmable equalization element (e.g., a number of programmable amplification elements each with a bandpass filter selecting a specific sub-band on which the amplification is applied). Spatial Audio Effects Processor 120 may also be provided with an element capable of determining the programming for each of its operative elements.

For some implementations or use cases of the present invention, it may be desirable or necessary to translate the position for one or more user interface elements in the spatial model into parameters that Spatial Audio Effects Processor 120 can use to produce the desired spatial perception for a user. For these implementations, an additional function of Spatial Audio Effects Processor 120 may be to perform this translation, and to set the parameters of the Spatial Audio Effects Processor elements appropriately. For example, in the case where Spatial Model Manager 110 defines a user interface element positioned directly to the left of the user, and where the spatial audio effects processing is performed by an element that attenuates the right ear and amplifies the left ear, Spatial Audio Effects Processor 120 may determine the amplification and attenuation for each ear, and program the amplification and attenuation elements appropriately. In the case where the audio effects processing elements are implemented within a digital signal processor, this function may be implemented as an additional function within the digital signal processor. Where the elements are implemented as analogue audio processing elements, this function may be implemented by a microprocessor (to calculate the appropriate values) and digital or analog output pins (for example an analog-to-digital converter) to program the value.

Spatial Input Decoder 130 functions to decode user inputs and determine their effect on the arrangement of user interface elements as defined by the spatial model maintained by Spatial Model Manager 110. In a typical embodiment, Spatial Input Decoder 130 takes user input provided by a device or user input element. Consider an example system where the user input is provided by a rocker switch (which can provide the actions "Left", "Right" and "Forward"). Spatial Input Decoder 130 might receive one of these actions as its input. In such a case, a function of Spatial Input Decoder 130 is to (in conjunction with Spatial Model Manager 110) use the input to cause a transformation of the spatial model. For example, receipt of a "Left" input might apply a uniform left rotation of, for example, 45 degrees, bringing user interface elements that are to the left in the spatial model more towards the front, while bringing user interface elements that are forward more to the right. Pressing "Forward" might provide a transformation that moves the center of the spatial model forward compared to its current position (i.e., bringing user interface elements that are in front closer). Based on the relationship between Spatial Model Manager 100 and Spatial Audio Effects Processor 120, such an action also has the effect of moving the apparent position of the audio sources towards the user.

In some embodiments, Spatial Input Decoder 130 may be implemented as suitable software code running on a suitable microprocessor, such as an ARM7 microprocessor, for example. Spatial Input Decoder 130 communicates with Spatial Model Manager 110 and may be used to provide updates to positional information, or to cause changes in the orientation or position of the user interface elements, where those elements are displayed in accordance with the model maintained by Spatial Model Manager 110. In the case where Spatial Input Decoder 130 is implemented as software code running on the same microprocessor as Spatial Model Manager 110, Spatial Input Decoder 130 may communicate these updates by calling a suitable function, by changing the contents of a shared region of memory, or by another suitable operation. In the case where Spatial Input Decoder 130 is implemented separately from Spatial Model Manager 110, these updates may be communicated using an I2C interface or another appropriate communication interface.

Spatial Model Manager 110 communicates with Spatial Audio Effects Processor 120 to update parameters affecting the spatial effects processing of the audio corresponding to various user interface elements. In the case where Spatial Model Manager 110 and Spatial Audio Effects Processor 120 are implemented in the same microprocessor, the communication might be effected by calling suitable functions, or by updating a shared region of memory, or by another suitable operation. In the case where Spatial Model Manager 110 and Spatial Audio Effects Processor 120 are implemented on separate processors, the communication might be performed over a suitable data bus. In the case where Spatial Model Manager 110 is implemented as a microprocessor, and Spatial Audio Effects Processor 120 is implemented as a series of analog or digital audio signal processing elements, the communication may be effected by the microprocessor setting the outputs of suitable general purpose input/output pins.

Figure 2A:
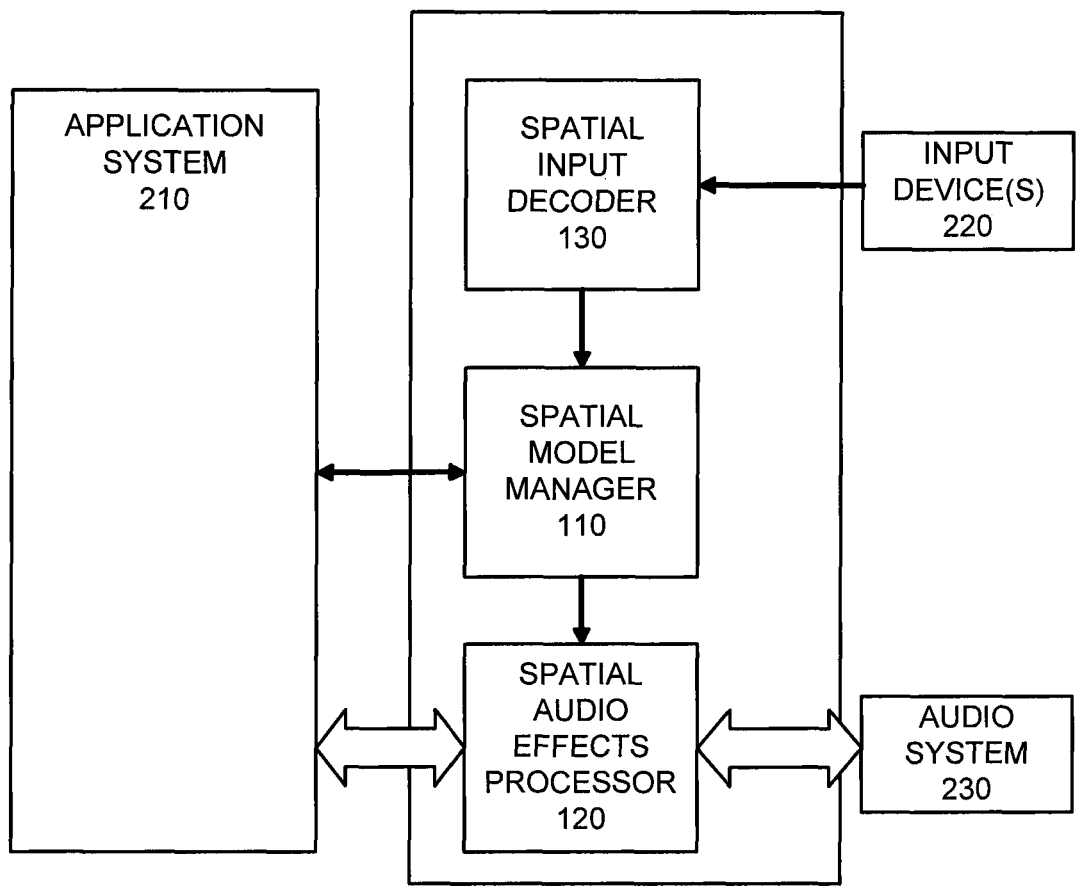
FIG. 2(a) is a block diagram illustrating how the primary functional elements depicted in FIG. 1 may be connected to and interact with the elements of an application, system, or device for which the present invention is providing a user interface.

FIG. 2(a) is a block diagram illustrating how the primary functional elements depicted in FIG. 1 may be connected to, and interact with, the elements of an application, system, apparatus, or device for which the present invention is providing a user interface. As depicted in the figure, Spatial Audio Effects Processor 120 and Spatial Model Manager 110 are connected to the application system 210 for which the present invention provides a user interface. Application system 210 may take any suitable form, including for example, a microprocessor running appropriate application software code to perform the primary tasks of the system, device, or application for which the present invention provides a user interface. For example, Application System 210 as embodied by a Bluetooth headset might be a microprocessor running application code for the headset (performing such tasks as establishing radio links, initiating and terminating calls, and so forth). In a mobile telephone, Application System 210 may be the operating system for the mobile telephone together with the microprocessor on which the operating system runs. Application System 210 may take one or more of many possible forms, and provide a wide range of functions, with it being understood that a specific form and/or function are not required in order to be used with an embodiment of the present invention.

In some embodiments, Application System 210 provides information concerning the user interface elements or inputs that System 210 accepts to Spatial Model Manager 110. Such information may include a description of the user interface elements available to a user of the application, system, apparatus, or device, along with information regarding the operations or functions of Application System 210 that may be executed by selection of those elements. This may permit Spatial Model Manager 110 to be made aware of the user interface elements that can be used to construct the spatial model (in some embodiments, this may be implemented by use of Spatial Model Manager 110 functions that allow user interface elements to be added or removed). In operation, Application System 210 receives information from Spatial Model Manager 110 concerning user interactions, where such interactions are typically provided by one or more Input Devices 220 (e.g., buttons, switches, keyboards, pointing devices, touch surfaces, etc.).

Input Devices 220 typically receive as their input some action by a user (such as a finger movement to press a button or provide motion across a touch surface, a spoken command, an electrochemical signal generated by the body, etc.) and provide as their output a signal to an electronic system representing the user input or an action of the user (button pressed, command word spoken, etc.). User inputs to Input Devices 220 are processed by Spatial Input Decoder 130 and provided to Spatial Model Manager 110 for execution of the desired operation or function. In the case where Application System 210 and Spatial Model Manager 110 are implemented as instructions executed by the same microprocessor, communication between those two elements may be effected by calling suitable functions, updating of shared regions of memory, or another suitable process. In the case where Application System 210 is implemented as a set of instructions executed by a different microprocessor than Spatial Model Manager 110, such communication may be effected by communication over a suitable data bus, such as an I2C bus, for example.

Spatial Input Decoder 130 may be coupled (i.e., connected or otherwise capable of communicating with and/or exchanging signals with) to any suitable Input Device 220, for example a microphone (although a microphone may instead be provided as part of Audio System 230 described below), a set of buttons, a navigation switch, a joystick, a thumbwheel, a touchpad or other touch sensitive surface, an accelerometer, or any combination of the above, as well as other suitable input systems or devices. Note that Input Device 220 may be provided as part of Application System 210, and may perform additional tasks for the application system other than those performed with regards to the input of data or commands by a user as part of utilizing the user interface elements.

Spatial Audio Effects Processor 120 may also be coupled to a suitable Audio System 230 for conveying audio to, and receiving audio inputs from, the user. Audio System 230 receives as inputs electrical signals corresponding to the audio to be heard by the user and provides as its output audio corresponding to the input (and vice-versa, receiving audio signals such as from a microphone and turning them into electrical signals that encode the audio signal). Audio System 230 thus processes signals corresponding to a desired audio stream into auditory signals, and acts in the reverse direction to process auditory signals into electronic signals. Audio System 230 may comprise a CODEC connected to a microphone and speaker (or headphones), or another suitable system. Spatial Audio Effects Processor 120 may communicate with Audio System 230 via an I2S or other audio data bus, for example. Note that Audio System 230 may be provided as part of Application System 210, and may perform tasks for the application system in addition to those performed for the user interface functions.

Spatial Audio Effects Processor 120 may also be coupled to Application System 210 and functions to convey audio signals and/or data corresponding to user interface elements to and from Application System 210. In embodiments where Spatial Audio Effects Processor 120 is implemented as a set of instructions executed by the same microprocessor as Application System 210, such communication may be effected by calling suitable functions, by updating shared regions of memory, or another suitable process. In embodiments where Spatial Audio Effects Processor 120 is implemented as a set of instructions executed by a different processor than Application System 210, such communication may be effected by use of a suitable data bus, such as an I2S data bus or USB data bus, or another suitable method.

In embodiments of the invention, Spatial Model Manager 110 and Spatial Audio Effects Processor 120 operate on audio user interface elements (and data concerning the presentation and operation of such elements) provided by Application System 210 (and in some cases, metadata concerning such elements which may also provided by Application System 210) to generate the spatially perceived audio signals that correspond to the user interface elements and enable user interaction with the user interface elements.

Note that a wide range of audio user interface elements are known, and in general any audio signal or sound that a user recognizes and may wish to interact with can be considered an audio interface element. Examples of suitable audio signals, sounds, or prompts that may be used as indications of a user interface element (and possibly also of its significance and/or function) include, but are not limited to, audio prompts (which may be pre-recorded audio data such as spoken human voice prompts or recorded musical prompts, or may be generated audio data such as MIDI musical prompts or beeps generated by a sound generator), simplex, duplex and half-duplex voice streams (which may include a telephone call, a two-way radio conversation, a conversation using a Voice over IP system), one of a number of conversations in a conference call, received or transmitted broadcasts (such as a radio stream), or the playback of an audio file (such as stored music being played in, for example MP3 or AAC format).

Each user interface element may be associated with a range of metadata indicating one or more potential or current user interaction(s) or operations that are possible with the user interface element. For example, an audio prompt might be associated with metadata indicating that it can be "selected", "unselected", or be "under inspection".

Metadata for a user interface element may take a number of different forms. For example, it may be a Boolean (i.e., a data item taking one of two possible values), an enumeration (i.e., a data item taking one of a fixed number of possible values), a scalar (i.e., a data item taking a value in a range), a vector (i.e., a data item taking a value in a range on more than one axis), or any other suitable format.

Figure 2B:
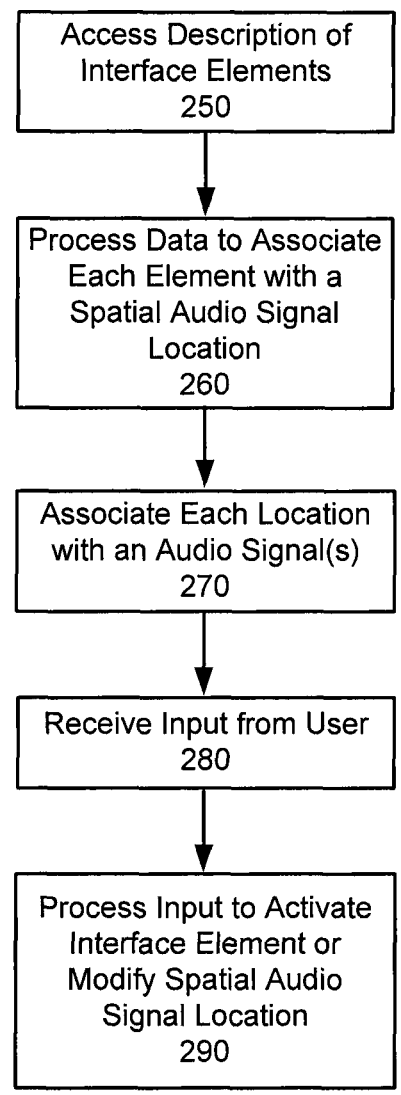
FIG. 2(b) is a flowchart illustrating a method or process for generating a spatial user interface and interacting with a user, in accordance with some embodiments of the present invention.

FIG. 2(b) is a flowchart illustrating a method or process for generating a spatial user interface and interacting with a user, in accordance with some embodiments of the present invention. As depicted in the figure, in some embodiments the inventive method or process may start with accessing a file or data structure that contains a description and other relevant information regarding the user interface elements for the application for which the invention is intended to generate a spatial user interface (stage 250). The file or data structure will generally be associated with the application, and may be part of the application or accessed from a web-site or other location associated with the application. The accessed file or data structure may include data or information describing the user interface elements, characteristics of the user interface elements, functions of the user interface elements, values of the user interface elements, the relative importance or significance of the user interface elements, a suggested spatial display of the user interface elements, or other data or information relevant to the definition, function, display, or use of the user interface elements. After accessing information regarding the user interface elements for the application (or if not all such elements, those for which the spatial UI is desired), the user element information is processed to generate the spatial model (stage 260).

The spatial model associates each user interface element with a location in a user's perceived audio space, i.e., each user interface element will be perceived by the user as a sound or sounds originating from a specific location or region relative to the user. The association of each user interface element to a location or region may depend in whole or in part on various factors, including the function or operation of that element, the relative significance or frequency of usage of that element, human behavior models that indicate a preferred arrangement of certain elements because such an arrangement may enhance discovery, navigation, or use of those elements, etc. In some embodiments, the generation of the spatial model may be achieved through application of heuristics, rules, etc. which function to map each of the desired user interface elements to a location or region in the user's audio space where an audio signal or prompt corresponding to that element will be perceived by the user.

Next, an audio signal or signals are associated with each spatial location in the user's audio space (stage 270). The audio signal or signals associated with each location (and hence with a specific user interface element or function) may be chosen for any suitable reason. For example, an audio signal may be selected because it is commonly thought of as being associated with that user interface element or the function of that element, because the signal will draw a user's attention to that user interface function, etc. Similarly, the volume or sound effects (echo, increasing or decreasing pitch, etc.) associated with a user interface element may be selected based on a desire to enable a user to sufficiently differentiate between user interface elements, or to enhance user discovery, navigation, or the utility of certain user interface elements. Note that the steps of associating a user interface element with a region or location of a user's audio space and associating each user interface element with a specific audio signal may be performed in one or multiple steps, and may be performed in any order as is determined to best implement the present invention (e.g., to first associate a sound or audio signal with each user interface element and then to determine the desired spatial location perceived by the user for each sound or signal—in such an example, the order of steps 260 and 270 might be reversed).

After the inventive system or apparatus generates the spatial user interface by associating each user interface element with a specific audio signal or signals and causing that signal or signals to be perceived by a user in a particular region of the user's audio space, a user may input data, a command, or an instruction using a suitable data input device (stage 280). The data, command, or instruction may be intended to select a function or operation of an element of the user interface, or to navigate or re-orient the spatial model by altering the presentation of the audio signals that correspond to the elements of the user interface. The user input is processed to determine whether it represents the selection/activation of a function or operation, or instead is intended to alter the presentation of the user interface elements in the user's perceived audio space (stage 290). In response, and after this determination, the desired function or operation is activated (such as processing of a call, altering the volume, switching to a new song in a playlist, etc.), or the spatial user interface is altered to cause a change in how some or all of the audio signals corresponding to the user interface elements are perceived by the user in the user's audio space.

An example of the function or operation of the Spatial Model Manager will be described with reference to FIG. 3, which illustrates an example spatial model and the placement of exemplary user interface elements in that model, in accordance with some embodiments of the present invention.

Figure 3:
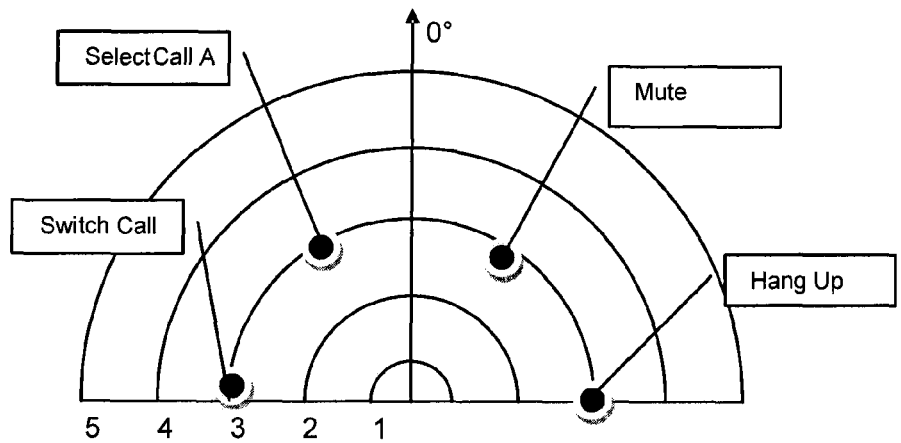
FIG. 3 illustrates an example spatial model and the placement of example user interface elements in that model, in accordance with some embodiments of the present invention.

FIG. 3 illustrates an example spatial model that may be used in some embodiments of the present invention, in this case a two-dimensional polar conceptual space, limited to two quadrants. Lines of equidistance from the origin are marked in 0.1 unit intervals. It should be understood that the spatial model depicted in the figure is an abstract construct, and therefore the distance is marked in arbitrary units. It should also be understood that the spatial model depicted is one of a number of possible or suitable spatial models. For example, another suitable spatial model might be one where audio signals are arranged on linear x-y axes, where the space extends for 360°, or one where the radial contours are placed logarithmically rather than linearly, and so forth. It should also be understood that the spatial model does not need to be limited to two dimensions, and may be represented as a one or three dimensional space.

FIG. 3 also illustrates four exemplary audio user interface elements that represent functions, operations, or processes which may be available to a user as part of an audio telephony system providing an active call to the user. The figure also illustrates the functions or operations that the user may perform as part of controlling or interacting with the active call.

In this example, the currently active call, identified as Call A (and selectable by activation of the corresponding user interface element), is provided as a user interface element enabling the user to listen to and speak on the call, as well as to change its volume and perform other actions. A voice prompt "Switch Call" is provided, with selection of that prompt effective to switch the current call with a waiting call, which for the sake of example, can be considered to be currently available. A "Mute" voice prompt is provided that functions to silence the user's microphone so that their voice is muted. A "Hang Up" voice prompt is provided that is effective to disconnect the current call (i.e., call A).

In the example shown in the figure, the available audio user interface elements are placed in the perceived audio space such that they are separated by angle, and equidistance from the origin, all being 0.3 units from the origin. It should be understood that other arrangements of relative spacing and location are possible and may be chosen based on considerations of ease of use, discoverability, etc.

In some embodiments, a spatial arrangement of the relevant audio user interface elements may have been pre-determined or suggested as desirable. For example, a pre-determined placement may be generated for each of a number of audio user interface elements depending upon that number (that is, for example, one pre-determined arrangement might be used when exactly 3 elements are available, while another pre-determined arrangement might be used when exactly 4 elements are available, and so forth), or the arrangement of the elements may be determined by metadata provided by the application system. For example, as mentioned, the application system may provide, in addition to data describing each user interface element, an item of metadata indicating the importance or priority to the user of the user interface element (which may be a function of the current application system state). In such an example, the distance from the origin of the initial placement of the user interface element on the spatial model might be determined such that more important elements are placed closer to the origin. Alternatively or additionally, the most important elements might be placed more centrally (that is closer to 0°). Similarly, an initial spatial audio arrangement of user interface elements might be changed in response to a new application system or to a changed state or operating condition of an existing application system (so as to present different or differently oriented user interface elements based on a change in the state, condition, or operation of a system or application).

In some embodiments, the arrangement of the user interface element(s) may be chosen to optimize the listening experience for the user. For example, elements may be arranged so as to maximize the separation or user recognition (discoverability) between elements that have a similar frequency spectrum (for example, an element with mostly treble audio sounds might purposely be placed near an element with mostly bass audio sounds). User interface elements may be placed in accordance with psycho-acoustic principles, that is, maximally separated according to which of the perceptually important audio sub-bands are contained in the signal or prompt for each element.

The placement of the user interface elements on the spatial model (and hence how the audio signals corresponding to those elements are perceived by a user) is provided to the Spatial Effects Audio Processor (element 120 of FIGS. 1 and 2(*a*)). Typically, this is done in a manner that can be related to the user interface audio element data received by the Spatial Effects Audio Processor from the Application System. For example, the user interface elements may be numbered from 0 upwards, the number being provided to the Spatial Model Manager and being the number of a port on the Spatial Effects Audio Processor. In this case, the Spatial Model Manager may provide spatial information, for example the angle and distance from the origin for the user interface element(s), as illustrated in the following table:

| User Interface Element | Identifier Passed Between Application System and Spatial Model Manager | Port Number for Data Passed Between Application System and Spatial Audio Effects Processor | Data Passed Between Spatial Model Manager and Spatial Audio Effects Processor |
|---|---|---|---|
| Call A | 0 | 0 | 0: 0.3 @ 30° |
| Switch Call | 1 | 1 | 1: 0.3 @ 90° |
| Mute | 2 | 2 | 2: 0.3 @ −30° |
| Hang Up | 3 | 3 | 3: 0.3 @ −90° |

As shown, the table indicates that the user interface element standing for "Call A" is identified to the Spatial Model Manager as user interface element 0, and has its audio data passed to the Spatial Audio Effects Processor via Port 0. The Spatial Model Manager communicates the position of the user interface element on the spatial model to the Spatial Audio Effects Processor by indicating that User Interface Element 0 is at a distance of 0.3 and an angle of 30°, and so on for the other user interface elements.

Figure 4:
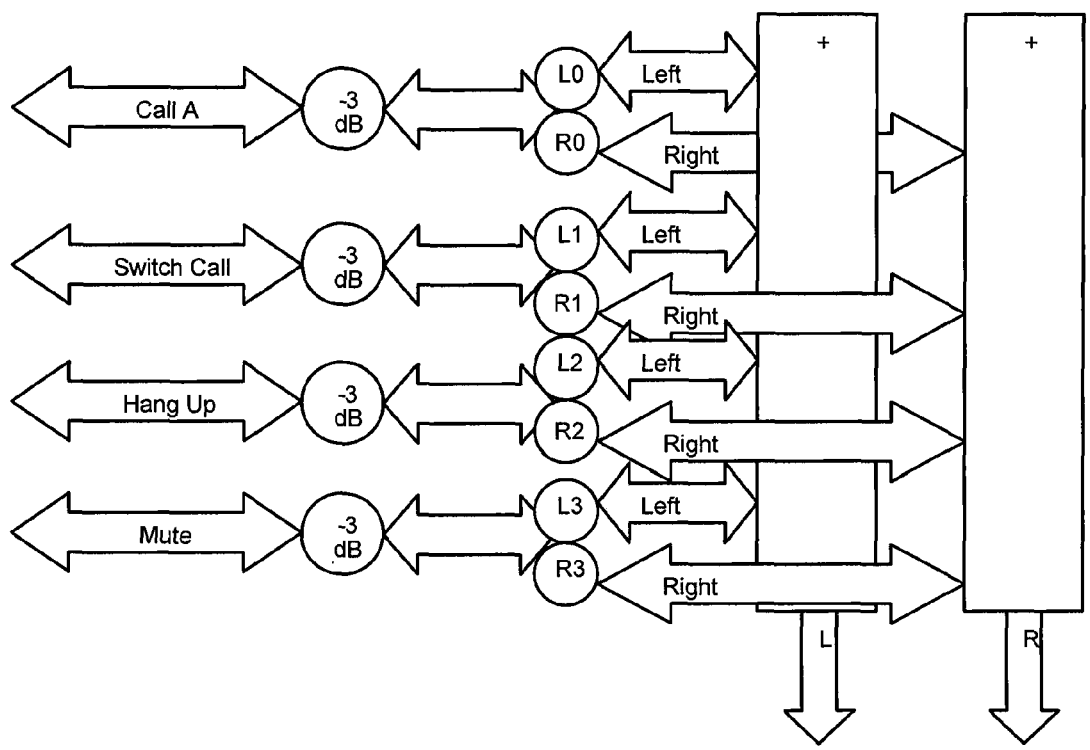
FIG. 4 illustrates an example of the functionality of the Spatial Effects Audio Processor as applied to the example audio user interface elements and example spatial model described with reference to FIG. 3, for the case where the output to the Audio System comprises two streams, one intended as a Left channel and one intended as a Right channel for use in a stereo headset or speaker system.

FIG. 4 illustrates an example of the functionality of the Spatial Audio Effects Processor (element 120 of FIGS. 1 and 2(a)) as applied to the example audio user interface elements and example spatial model described with reference to FIG. 3, for the case where the output to the Audio System (element 230 of FIG. 2) comprises two streams, one intended as a Left channel and one as a Right channel for use in a stereo headset or speaker system. In the example Spatial Audio Effects Processor shown in FIG. 4, it should be understood that each audio user interface element is initially attenuated to a degree depending on its distance from the origin (elements at the origin being heard at their input volume, streams 1 units away being attenuated by 1 dB, and so on).

Subsequently, both a left channel and a right channel stream are generated for each audio source, with the relative strengths of the left and right channel volumes for each source being calculated according to their angle in the spatial model. The result is that the apparent direction (i.e., the perceived angular location relative to the user) of the audio source when heard through headphones or a stereo speaker system is the same or approximately the same as the angle in the spatial model. All of the left channel streams are added together (i.e. mixed) into a final left channel output and all of the right channel streams are similarly added together into a final right channel output.

Mathematically, the left output stream may be given by the function:

$$S_{leftoutput}(t) = \sum_{selected\ input\ streams} \frac{(1 - M_{stream})((90 + arg_{stream}))}{180} S_{stream}(t)$$

where $s_x(t)$ gives the instantaneous value of the given stream at time t, M is the magnitude of the stream in the spatial model, and arg is the argument in degrees.

The right output stream may be given by the function:

$$S_{rightoutput}(t) = \sum_{selected\ input\ streams} (1 - M_{stream}) \frac{(90 + arg_{stream})}{180} S_{stream}(t)$$

Considering the example given in FIG. 4, note that four mono audio streams are input to the Spatial Audio Effects Processor, one from each of the four streams 'Call A'—being the audio stream associated with an actual audio call—'Switch Call'—being the audio stream associated with a user interface element allowing the user to switch to another call—'Hang Up'—being the audio stream associated with a user interface element allowing the user to hang up the current call—and 'Mute' being the audio stream associated with a user interface element allowing the user to mute the current call. It can be seen that initially each stream is attenuated by 3 dB (where such attenuation is due to each stream being, as shown in FIG. 3, at a distance of 3 units from the center of the spatial model). Each stream is then copied, so that for each stream there exists a Left stream (intended to be provided to the user's left ear) and a Right stream (intended to be provided to the user's right ear). Each Left or Right stream may then be amplified or attenuated by a desired amount (e.g., L0 in the figure is the attenuation on the Left stream for user interface element 0, R0 is the attenuation of the Right stream for this element, and so forth). The attenuations may operate to produce an apparent spatialization (i.e., a location or other behavior in the audio space perceived by a user) according to the angle of the user interface element. The Left streams are then mixed together to provide the composite left ear stream for presentation to the user, and the Right streams are mixed together to provide the composite right ear stream for presentation to the user.

In an example embodiment where the Spatial Audio Effects Processing system is implemented by software code executed by a programmed digital signal processor or microcontroller, the software code would typically be used to implement the above mathematical functions. Note that other algorithms are known for generating the left and right components from a mono audio stream (including delaying one signal slightly and taking into account head shadow effects), and these may also be suitable for use with some embodiments of the present invention.

Note that a user listening to headphones, for example, connected to an audio subsystem operating on these streams, would hear the user interface elements at approximately the same volume, with the audio stream that is "Call A" appearing at approximately 30° left of center, the audio prompt for "switch call" being heard at an apparent position of all the way left of center, the audio prompt for Mute being heard approximate 30° right of center, and the audio prompt for Hang Up being heard all the way right of center. The user will be able to distinguish the spatial arrangement (angle and magnitude from the origin) of the user interface elements in the abstract spatial model by their correspondence to the apparent spatial arrangement of the sources in the user's perceived stereo audio space.

In some embodiments, audio input from the user (from a microphone for example) need not be modified by the spatial arrangement of the user interface elements. In this instance, the Spatial Audio Effects Processor would provide no position-based effects for the microphone input. In other embodiments, the audio input could be directed differently on different return duplex paths according to the position of the streams presenting such duplex return paths. For example, in a conference call with multiple callers, the microphone audio stream might be provided only to those duplex user interface elements which are placed sufficiently close to the user.

Note that many different spatial effects functions can be provided by the Spatial Audio Effects Processor, singularly or in combination. Further, it is not necessary that the spatial arrangement of the audio heard by the user be mapped directly to the spatial model, but merely that the user can relatively easily understand the spatial arrangement of user interface elements on the spatial model from what is presented to them in the form of audio signals, prompts, etc. Further, it is not necessary for the audio to be presented in stereo for the user to be able to understand the spatial model, as it may be presented in monaural instead.

For example, in the case of a mono headset, instead of performing a stereo balance adjustment to the user interface elements, the Spatial Audio Effects Processor could apply a notch filter, with a bandwidth of approximately 1.5 kHz and whose notch frequency is approximately 8 kHz for user interface elements at 0 degrees, reducing for elements that are positioned further to the left on the spatial model and increasing for elements that are positioned to the right. This may be beneficial because it is known that the human ear perceives sounds to which a notch filter above 8 kHz is applied as coming from above the head, and sounds to which a notch filter below 8 kHz is applied as coming from below the head. Such a filter, when used in conjunction with other elements of the invention, would allow users to understand a relationship between the apparent positioning of user interface elements above and below them, and the arrangement of user interface elements on the spatial model.

A range of effects or signal processing operations may be applied by the Spatial Audio Effects Processor to enhance a user's ability to discriminate between different user interface elements. For example, the audio signal for the user interface elements may be delayed by an amount of time proportional to the magnitude or angle on the spatial model. Or, an amount of reverberation might be provided to the audio signal, such that elements further from the origin have more reverberation or elements further to the left or right are adjusted to have more reverberation.

Further, as noted, the spatial model does not need to be limited to two dimensions. Additional dimensions may be introduced by using a greater number of effects in the mixing and an effects system to map to the additional degrees of freedom. For example, if the spatial model is three dimensional, then volume, stereo angle and reverberation might be combined to give three dimensions in the audio output that the user may correlate with the dimensions in the spatial model.

Once a user is able to determine the spatial arrangement of the audio user interface elements in the spatial model (by detecting audio effects and features that correlate with the positions of user interface elements in the spatial model), they can use this information, in conjunction with a suitable input device, to control and affect the operation of a system, apparatus, device, or other object or process.

In some embodiments, a beneficial characteristic of a suitable input device is that it may provide an input mode that the user can intuitively relate to the position of user interface elements in the spatial model (and therefore also in the audio space that they perceive). Many different input devices are possible, including navigation switches, thumbwheels, accelerometers, touch sensors, etc. The input device, through the Spatial Input Decoder, may cause the spatial model to change directly, or it may cause changes to an application or device operation which in turn may cause changes to the spatial model.

Figure 5:
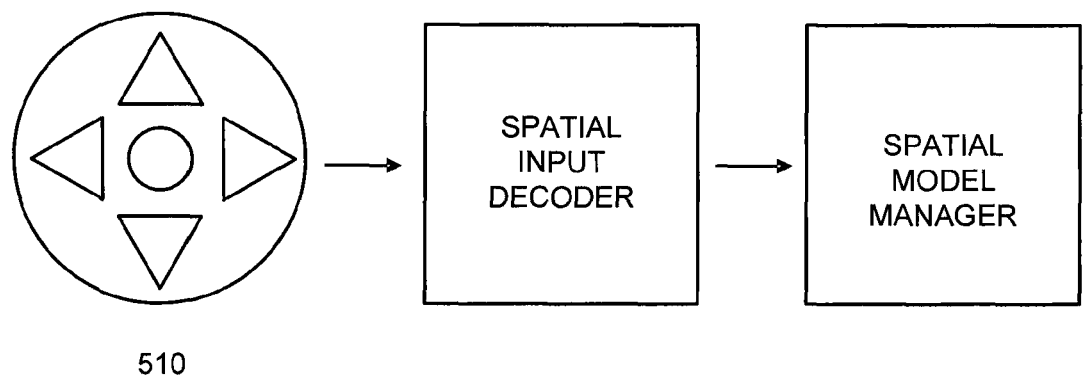
FIG. 5 is a diagram illustrating an example input device to enable a user to interact with the spatial model and user interface elements, in accordance with some embodiments of the present invention.

FIG. 5 is a diagram illustrating an example input device to enable a user to interact with the spatial model and user interface elements, in accordance with some embodiments of the present invention. Consider, for the sake of example, the spatial model as illustrated in FIG. 3, as it may be affected by an input from the example input device illustrated in FIG. 5. In this example, the input device is a navigation switch 510, enabling the user to select one of four directions, with a center "select" button that is activated by a user pressing the button. The navigation switch is capable of providing information as to which combination of the 5 buttons (namely Up, Down, Left, Right, Select) are pressed.

Consider the case where the user, listening to the audio streams as in the above examples, wishes to focus on speaking to the party or parties on Call A. In this situation, the user may not wish to have the voice prompts heard any longer. The user is aware, as described above, that the Call A user interface element, the call itself, is situated slightly to the left of center (because they can hear it apparently positioned slightly to the left of center, as depicted in FIG. 3).

Figure 6:
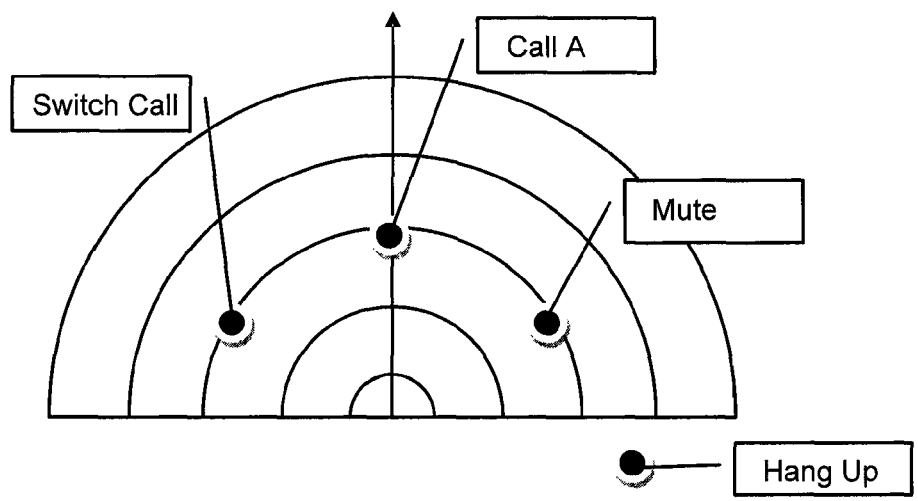
FIG. 6 illustrates the spatial model illustrated in FIG. 3, after the user has pressed the Left button on the navigation input device of FIG. 5.

In one implementation of the invention, pressing the "left" button on the data input device may be sufficient to select an option situated to the left (that is, in this example to switch the call). However, for the sake of providing another example of the operation of the invention, another embodiment is considered. Thus, in this example, FIG. 6 illustrates the spatial model illustrated in FIG. 3, after the user has pressed the Left button on the navigation input device of FIG. 5. As shown in FIG. 6, as a result of pressing the "left" button, the spatial model has been rotated by 30°, so that Call A is now directly in front of the user (i.e., the audio stream corresponding to Call A is now positioned in front of the user). Note that in this example, the "Hang Up" user interface element no longer fits on the example spatial model. As a result the user will no longer hear this audio stream or prompt.

Figure 7:
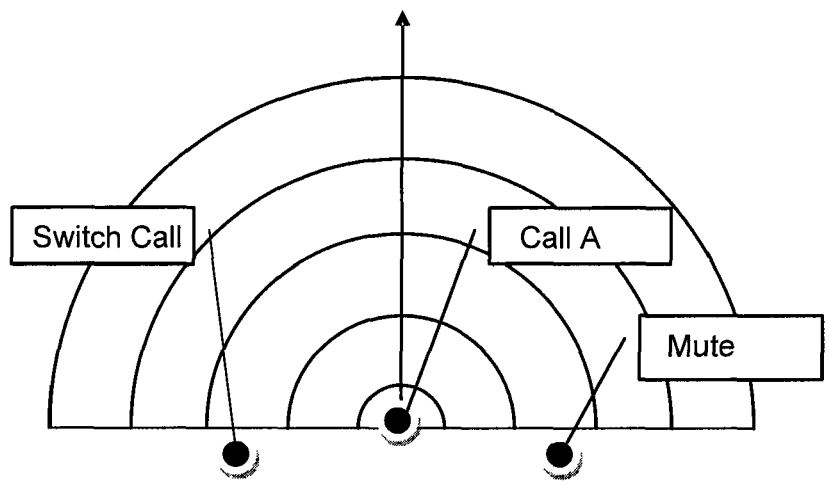
FIG. 7 illustrates the spatial model illustrated in FIG. 6, after the user has pressed the "Up" button on the navigation input device of FIG. 5.

Consider next, by way of example, that the user presses the "up" button on the user input device of FIG. 5. FIG. 7 illustrates the spatial model illustrated in FIG. 6, after the user has pressed the "up" button on the navigation input device of FIG. 5. As shown in FIG. 7, the origin has now been translated forward (in the direction suggested by the input device press). The audio stream corresponding to Call A now appears close and centrally located. The other user interface elements no longer map onto the spatial model, so only the audio signal from Call A is heard. If the user presses "down" on the navigation switch at this point, the spatial model will translate back to its previous position, restoring the previous spatial model (and correspondingly heard audio space) as shown in FIG. 6. Note that a variety of navigation switch presses can be used to rotate the spatial model and translate, or otherwise transform the spatial model, so that the user can present and navigate the spatial model in a manner they find most helpful.

Now consider the case where the user wishes to hang up the call. In this instance they might rotate right until the "Hang Up" prompt is heard centrally, and then move forward so that it is at the origin. They might then press the select button to confirm their action. Alternatively, the process of moving the prompt right to the origin might be sufficient to indicate that the user wished to hang up.

To perform this navigation or re-orientation of the audio signals or prompts perceived by the user, the Spatial Input Decoder takes the input from the input device and transforms it into a relevant command for the Spatial Model Manager. For the navigation switch input device and actions described above, the function of a suitable Spatial Input Decoder might be described as follows:

| Input Device Action | Message to Spatial Model Manager |
|---|---|
| Left | Rotate 30° |
| Right | Rotate −30° |
| Up | Move origin up 3 units |
| Down | Move origin down 3 units |
| Select | Selection action on closest item |

Note that in this example, a user input choice that a user can relate to the spatial arrangement of the audio streams as they perceive them to be arranged cause changes to the spatial model, with a corresponding change to the output as heard by the user.

Note that there are many possible relationships between user actions performed on an input device and the corresponding effects on the spatial model. In general, it is beneficial when the user better understands what changes to the spatial model will be caused by specific input actions. For example, user input choices might, instead of causing a rotation of the spatial model, cause a translation of the spatial model, moving the origin in a particular direction, and thereby causing streams placed spatially in that direction to appear closer and louder.

In some embodiments, the spatial model may, conceptually, be considered a continuum, in which many streams, including those not currently selected are placed. For example, audio prompts for "louder, softer" might be placed near to, but slightly beyond an audio stream whose volume can be changed. Moving towards the audio stream or bringing focus to that audio stream, might conceptually move the user towards a position where the volume prompts (to increase or decrease the volume) can be heard. Alternatively, the spatial model might comprise multiple smaller spaces, with links or jumps between spaces caused by the selection of particular options or by moving to particular positions in the spatial model, for example.

Figure 8:
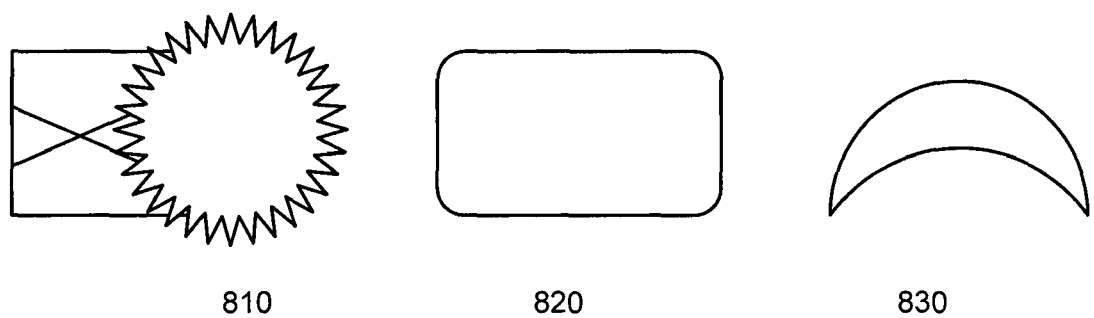
FIG. 8 illustrates additional input devices that may be operated by a finger or thumb and which may be used in a similar fashion to the input device depicted in FIG. 5, in accordance with some embodiments of the present invention.

As recognized by the inventors, there are a wide range of possible input devices suitable for use with the present invention, each with a corresponding input decoder that functions to translate a user input (or activation of an input element that is part of the device) to an instruction that can impact the arrangement or selection of audio signals in the spatial model. FIG. 8 illustrates additional input devices that may be operated by a finger or thumb and which may be used in a similar fashion to the input device depicted in FIG. 5, in accordance with some embodiments of the present invention.

One example shown in the figure is a thumbwheel 810, comprising a wheel that rotates about an axis, the axis being able to move against a spring in a direction perpendicular to the axis. Typically, such thumbwheels deliver a certain number of electrical pulses for every revolution the wheel is rotated, and one or more pulses as the axis is pressed in over a distance. The input decoder for such a device might typically count the pulses and determine the number of degrees of rotation or the distance, relative to the maximum travel, that the thumbwheel has been pressed in. Such an input decoder might provide this information to the spatial model manager, which in turn might rotate the spatial model, and translate it about the origin by an amount indicated by the number of revolutions of the thumbwheel.

Another example of an input device comprises a touchpad 820, whereby a user may move their finger in two dimensions, changing, for example, the resistance, or capacitance of certain detectors in an array of detectors. The decoder for this input device might determine where the user's finger(s) are in the relative space of the touchpad, and provide this information to the spatial model manager. The spatial model may then be translated in two dimensions as a result of the user's finger movements.

A third example of an input device comprises a crescent, horseshoe, or semi-circular touch-sensitive surface 830, such as a capacitive detector printed onto an electronic circuit board. The user may move their finger around the horseshoe, and potentially in and out from the center. The input decoder would comprise an analog-to-digital converter to detect the position of the user's finger. Movements around the crescent might be used to rotate the spatial model, while movements in and out might translate the spatial model.

It should be understood that while, for the sake of example, positional information in the user input space have been described as being mapped to positional information in the spatial model, other types of mapping are also possible and may be used in implementing the present invention. In particular, positional information in the input device space may be mapped to velocities or accelerations of audio signals in the spatial model (e.g., the velocity with which a sound moves towards or away from a user). In some embodiments, this may be indicated by a Doppler effect (i.e., rising or falling pitch) that is superimposed on the audio signal.

Figure 9:
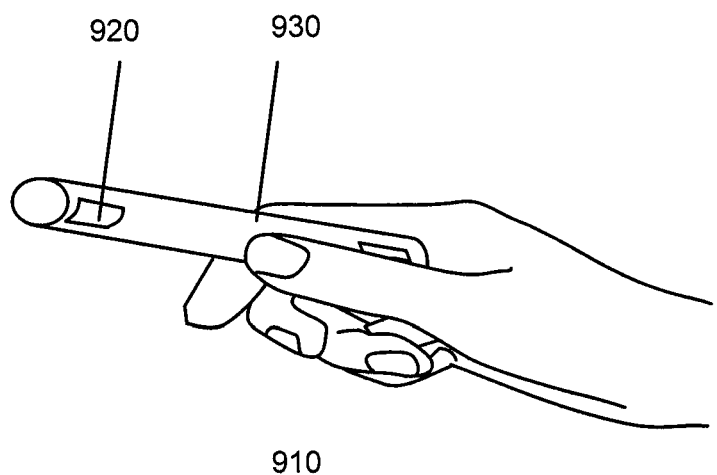
FIG. 9 illustrates an input device which uses accelerometers to map movement of a user's hand to changes of the spatial model, in accordance with some embodiments of the present invention.

In addition to input devices activated by a user's finger touching or pressing something, other input devices and their corresponding input detectors are possible and may be used in implementing the present invention. FIG. 9 illustrates a possible input device 910 which uses accelerometers to map movement of a user's hand to changes of the spatial model.

The input device illustrated in FIG. 9 comprises, by way of example, two 3-dimensional accelerometers 920 fitted to a hand-held casing 930. The user might hold this input device, and move it, for example pointing towards the left or the right. The input decoders for input device 910 might comprise electronic circuitry that determines the common mode and differential mode signals in 3 dimensions from the two accelerometers, and thereby determines both movements and rotations in space of the casing (as caused by the user's hand). This may be mapped to corresponding translations and rotations of the spatial model.

Figure 10:
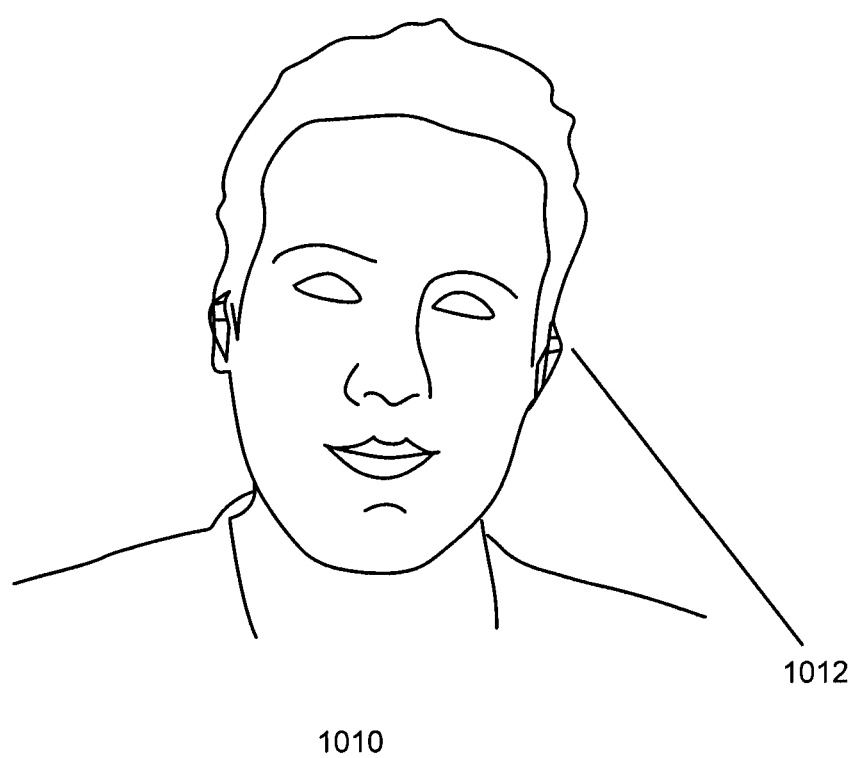
FIG. 10 illustrates another input device that may be used in some embodiments of the present invention, where the input device includes accelerometers attached to each side of a user's head.

FIG. 10 illustrates another input device 1010 that may be used in some embodiments of the present invention, where the input device includes accelerometers 1012 attached to each side of a user's head. The input decoder for this input device is similar to the one that may be used for the example input device described with reference to FIG. 9. As the user moves their head from side to side, the accelerometers detect this movement and, via the input decoder, can rotate, translate or otherwise change the spatial model, and hence the audio signals perceived by the user.

In a further example embodiment of an input device, the user might wear electrodes attached near the eyes in the form of an electro-optigram. In this embodiment, the user's eye movements, as decoded by the input detector, can be used to produce transformations of the spatial model or cause selection of an element of the model.

It is noted that a possible problem with some input devices, such as those based on detecting head movements for example, is that it can be difficult to distinguish the movements that the user intends to be used as an input from those that the user makes as part of their normal actions. For example, a rotation of the head might be an input intended to cause the spatial model to rotate, or it might mean that the user has seen something they wish to look at.

Figure 11:
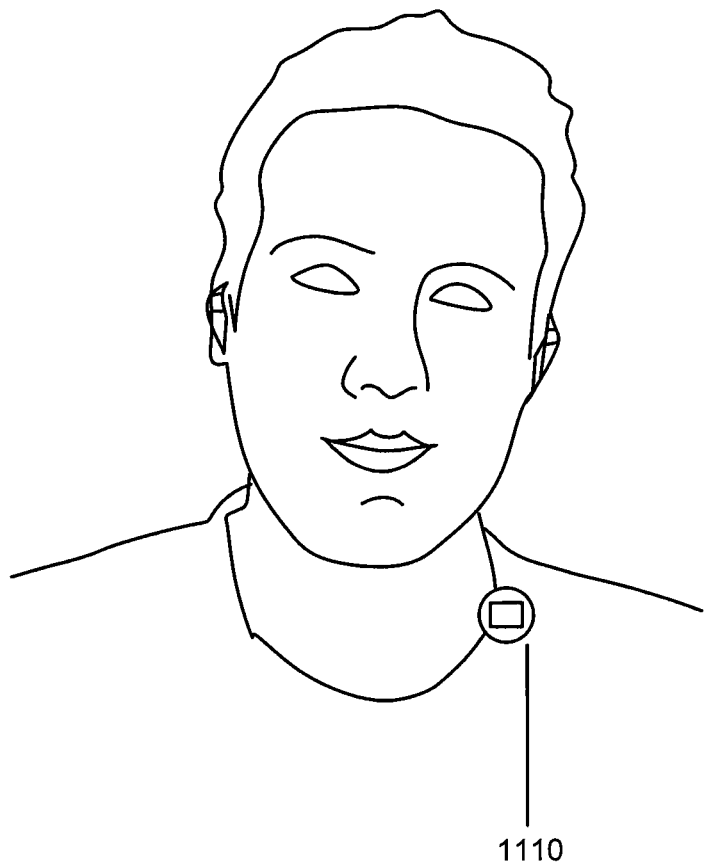
FIG. 11 illustrates a user input device in which a touch sensor is added to the elements of the input device of FIG. 10.

In response to this possible problem, FIG. 11 illustrates a user input device in which a touch sensor 1110 is added to the elements of the input device of FIG. 10. In this embodiment of a user input device, the input device is only active (and the input decoder only decodes an input) when the user is touching the touch sensor. The user must therefore touch or activate the touch sensor while making head movements for those head movements to be used to influence the spatial model.

In some embodiments, additional audio information may be provided by the Spatial Audio Effects Processor to indicate what actions are possible with regards to a specific user interface element, or to provide improved feedback from a user interface element. For example, some audio interface elements can be "Selected". For example, a user could select "Hang Up" to finish a call whereas they could not select an ongoing call. The Spatial Audio Effects Processor might provide audio effects to a user interface element to indicate what user actions are possible for that element. For example, "Selectable" elements might be provided with additional reverberation as the user approaches to indicate that a selection action may be taken by the user.

The following provide further information regarding the user experience and some exemplary use cases for the present invention. In terms of the user experience, typically, a user is able to hear any audio signal or stream that they are "in range of", where in range implies that the audio signal is relevant to their current application content, or to the functions or operations of the application or device. Note that a user may hear more than one audio signal simultaneously, but wouldn't necessarily hear all of those being generated. In this sense, some of the signals may be "out of audible range" in the user's perceived audio space (at least until they are provided as application options or have been navigated into a more prominent and discoverable position in the audio space). In one example embodiment, a broad navigation metaphor may be used to determine what is "in range", such as:

Move right=>Next;
Move left=>Previous;
Move forward=>More detail on the signal the user is currently focused on; and
Move back=>Move to less detail (i.e. go to parent), include new sources that are peers of the current one.

Note that a user may perceive multiple signals coming from multiple locations in the audio space. In some embodiments, a system may have different signals, with each playing in turn from different locations (first the left one, second the one straight ahead, third the one to the right). However, in general, it is desired to obtain greater utility (a more efficiently accessed user interface) by taking advantage of the human ear's ability to spatially separate simultaneous sources.

Two further example applications or use cases of the inventive spatial user interface are described below:

(a) An MP3 or Music Library Interface:

Here a user puts on the headset. Initially they hear, e.g., the name or samples of a number of genres: in the left ear "Hip-Hop", straight ahead "Reggae" to the right "Classical". They move within the audio space right (next) and left (previous) until they find the genre they want. As they go further to the right, additional genres appear as the current rightmost one rotates to the centre: "Rock", "Country", etc. When they hear the genre they want in front, they go forward to go "into" the genre. Now they hear the name of different artists, "Steel Pulse" in the left ear, "Heptones" in the centre, "Bob Marley" to the right. They then move left/right to browse artists. To choose an artist, they move "forward". To return back to the parent (i.e. the genre) they would press the backwards button again.

In such an example, the application system might be a microprocessor running code to read the available genres, albums and tracks from a local storage device such as a hard disk drive or a remote device such as a server. The application system might also keep track over a period of time of how frequently music from one genre, album or artist is played, so as to maintain a likelihood that a desired genre, album or artist will be played soon. Such an application system might be provided with a navigation wheel as a user input device (that is a system that allows the user to rotate left, rotate right and select by pressing on the appropriate part of the device).

From the list of genres available on the storage system, and from how frequently the genres are played, the application could form a number of user interface elements, with each one corresponding to a genre the user might select. For each user interface element, there could be an audio stream, for example a pre-recorded audio file of the name of the genre being spoken, together with a characteristic priority determined from the frequency of playback. Each user interface element would be added to the Spatial Model by use of the Spatial Model Manager.

For example, in pseudo-code,
SpatialModelManager.AddNewElement(new FileStream ("HipHop.wav", 5));
SpatialModelManager.AddNewElement(new FileStream ("Classical.wav", 2));
SpatialModelManager.AddNewElement(new FileStream ("Reggae.wav", 3));

Once the user interface elements have been added to the spatial model, the Spatial Model Manager determines their arrangement. Consider an example spatial model where user interface elements are equally spaced radially, with the highest priority further to the left and the lowest priority furthest to the right, and where higher priority elements are closer to the user while lower priority ones are further away. Note that such a mechanism will ensure that higher priority elements are both closer (and therefore louder) and more to the left, and that therefore the user will have a good sense of where different elements might be positioned and the characteristics of the elements (things the user finds most important are likely to be heard predominantly more to the left side and are also likely to be the loudest).

In this example, the Spatial Model Manager might place the user interface element for Hip-Hop in the left ear, quite close, the user interface element for Reggae in the centre, a bit further away, and the user interface element of Classical all the way to the right, and even further away (quieter). Imagine the user now rotates left on the navigation switch. This movement can be correlated with a user rotating their head to the left. If the user rotated their head to their left, then audible signals that had been towards their left will now be heard more in front of the user and audible signals that had been in front will now be heard more to the right. By a similar process, if the user rotates the input device to the left, user interface signals that had been more to the left will now be heard more in front and user interface signals that had been in front of the user will now be heard to the right. Note that the user has a simple, intuitive and rapid mechanism for exploring a range of options—options that are further to the left are the more likely ones, and by rotating the input device, the range of options can be arranged to rotate about the user so that they can determine which one to choose. Pressing the select button on the input device may enable them to choose the option now in front of them.

This interface is much more efficient than a typical menu system where the user hears each option sequentially (that is after the previous one has finished playing), it can be navigated in a natural manner (rotate the dial in the direction that the user interface element is heard from until they hear it in front of them), and it provides the user with a sense of the qualities of each element that helps then rapidly identify and select the appropriate element (the more likely ones are over to the left and a bit louder).

(b) A Conference Call System:

Here a user puts on the headset. They hear a number of people talking on the conference call, arranged around them—a first all the way to their left, a second at 45 degrees left, a third straight ahead, a fourth 45 degrees to the right and a fifth in the right ear. To leave the conference call, a user would go backwards and then would hear all the attendees talking from straight ahead, the prompt "leave conference call" in their left hear, and "mute the conference call" in their right ear. They would press forward again to go into the conference call again. If they wanted to have a private word with one of the participants, they would rotate the space to place the audio for that person in front of them. They would then press forwards again. They would hear only the selected party (perhaps with the addition of an audio signal that indicates they are in a private "room"). This enables the user to have a conversation with one party that isn't heard by the others participating in the conference. When the user is finished, they would press backwards, and would be placed back into the conference "room" again.

In some embodiments, the inventive methods, processes or operations for generating and using the described spatial user interface may be wholly or partially implemented in the form of a set of instructions executed by a programmed central processing unit (CPU) or microprocessor. The CPU or microprocessor may be incorporated in a headset, audio gateway, MP3 player, mobile phone, desktop computer, laptop computer, or other computing device. The instructions may be stored in a memory or other data storage device, embedded on a computer readable medium, or provided in any other suitable manner. Execution of the instructions may be shared between one or more programmed central processing units (CPU) or microprocessors.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software As noted, any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A system, comprising:
    a spatial model generator including a spatial input decoder in communication with a spatial model manager and operative to receive input data associated with a user interface element, and to generate output data defining a spatial location at which a user will perceive an audio signal corresponding to the user interface element, the user interface element including a multi-dimensional spatial model that determines the spatial location;
    a spatial audio effects processor in communication with the spatial model manager, the spatial audio effects processor operative to receive as an input an audio input and to generate the audio signal as an output comprised of multiple channels generated from a plurality of streams, a first portion of the plurality of streams comprising a voice stream, the spatial audio effects processor being configured to mix a second portion of the plurality of streams to form a second channel stream, to mix a third portion of the plurality of streams to form a third channel stream, to determine a strength of volume between the second channel stream and the third channel stream using the multi-dimensional spatial model,
    each channel modified relative to other channels according to its distance from an origin of the multi-dimensional spatial model, its angle in the multi-dimensional spatial model or both, the audio signal representing the processed audio input as perceived by the user at the spatial location;
    an application system in communication with the spatial audio effects processor and the spatial model manager, the application system being configured to provide user interface element information to the spatial model manager, the spatial audio effects processor being configured to communicate data corresponding to user interface elements to and from the application system; and
    an input device electrically coupled with the spatial input decoder, the input device including a plurality of 3-dimensional accelerometers, the input device operative to select the audio signal or to alter a spatial arrangement of the audio signal that is perceived by the user, and the arrangement of the audio signal including a selected one or more of transforming, changing, rotating, restoring, navigating, or translating the multi-dimensional spatial model in a plurality of dimensions.

2. The system of claim 1, wherein the spatial audio effects processor is further operative to process the audio input to include information that is suggestive to the user of the function or operation associated with the audio signal.

3. The system of claim 2, wherein the information that is suggestive of the function or operation associate with the audio signal includes one or more of echo, volume, rising pitch, falling pitch, or reverberation.

4. The system of claim 1, wherein the spatial model generator is operative to generate output data defining a spatial location that is suggestive to the user of the function or operation of the user interface element associated with the audio signal.

5. The system of claim 1, wherein the input data associated with a user interface element is one or more of data related to a function of the user interface element, an operation of the user interface element, or a relative importance of the user interface element.

6. A system, comprising:
- a plurality of audio signals, each signal being perceived by a user at a spatially distinct location, and each signal associated with a function or operation of the system, device, or application;
- an input device including a plurality of 3-dimensional accelerometers, the input device operative to generate an input signal that is decoded by a spatial input decoder in communication with a spatial model manager, the spatial input decoder operative to select one of the plurality of audio signals to alter a spatial arrangement of the audio signals that is perceived by the user, the spatial model manager operative to alter a spatial arrangement of the audio signals using a multi-dimensional spatial model, and the arrangement of the audio signals including a selected one or more of transforming, changing, rotating, restoring, navigating, or translating the multi-dimensional spatial model in a plurality of dimensions;
- a spatial audio effects processor operative to receive the input signal from the input device and in response to activate the functions or operation of the system, device or application, or to alter the spatial arrangement of the audio signals that is perceived by the user by generating an output comprised of multiple channels generated from a plurality of streams, a first portion of the plurality of streams comprising a voice stream, the spatial audio effects processor being configured to mix a second portion of the plurality of streams to form a second channel stream, to mix a third portion of the plurality of streams to form a third channel stream, to determine a strength of volume between the second channel stream and the third channel stream using the multi-dimensional spatial model, each channel modified relative to other channels according to its distance from an origin of the multi-dimensional spatial model, its angle in the multi-dimensional spatial model or both; and
- an application system in communication with the spatial audio effects processor and the spatial model manager, the application system being configured to provide user interface element information to the spatial model manager, the spatial audio effects processor being configured to communicate data corresponding to user interface elements to and from the application system.

7. The user interface of claim 6, wherein one or more of the plurality of audio signals includes information that is suggestive to the user of the functions or operation associate with the audio signal.

8. The user interface of claim 7, wherein the information that is suggestive of the function of operation associated with the audio signal includes one or more of echo, volume, rising pitch, or reverberation.

9. The user interface of claim 6, wherein one or more of the plurality of audio signals are perceived by the user at a spatially distinct locations that is suggestive to the user of the function of operation associated with the audio signal.

10. The user interface of claim 6, wherein one or more of the plurality of audio signals are perceived by the user at a spatially distinct location that is suggestive to the user of the relative importance of the function or operation associated with the audio signal.

11. A method for generating a user interface, comprising:
- accessing information regarding a user interface element;
- generating, at a spatial model manager, a multi-dimensional spatial model for the user interface element based on the accessed information, the multi-dimensional spatial model representing a mapping of the user interface element to a position in a user's perceived audio space;
- associating audio signals with the position in the user's perceived audio space, the audio signals modified according to a distance from an origin of the multi-dimensional spatial model, an angle in the multi-dimensional spatial model or both;
- receiving, at a spatial input decoder, an input signal an input device having a plurality of 3-dimensional accelerometers;
- processing, at a spatial audio effects processor, the received input signal using the spatial input decoder to determine whether the input represents a selection by the user interface element or a user request to alter the multi-dimensional spatial model, and the user request to alter including a selected one or more of transforming, changing, rotating, restoring, navigating, or translating the multi-dimensional spatial model in a plurality of dimensions, the audio signals included in a plurality of streams, a first portion of the plurality of streams comprising a voice stream, the processing being configured to mix a second portion of the plurality of streams to form a second channel stream, to mix a third portion of the plurality of streams to form a third channel stream, to determine a strength of volume between the second channel stream and the third channel stream using the multi-dimensional spatial model;
- providing, by an application system, user interface element information to the spatial model manager; and
- communicating, between the application system and the spatial audio effects processor, data corresponding to user interface elements.

12. The method of claim 11, wherein the accessed information is information related to a function or operation of the user interface element.

13. The method of claim 11, wherein the accessed information is information related to a relative importance of the user interface element.

14. The method of claim 11, wherein the audio signals associated with the position in the user's perceived audio space is one or more of a voice prompt, music, or a sound effect.

15. The method of claim 14, wherein the audio signals includes information that is suggestive to the user of the user interface element function or operation associated with the audio signals.

16. The method of claim 15, wherein the information that is suggestive of the function or operation associated with the audio signals includes one or more of echo, volume, rising pitch, or reverberation.

* * * * *